(12) United States Patent
Hilliard

(10) Patent No.: US 12,085,087 B1
(45) Date of Patent: Sep. 10, 2024

(54) WATERLESS GLAND ASSEMBLY FOR ROTATING EQUIPMENT

(71) Applicant: Timothy Neal Hilliard, Tucson, AZ (US)

(72) Inventor: Timothy Neal Hilliard, Tucson, AZ (US)

( * ) Notice: Subject to any disclaimer, the term of this patent is extended or adjusted under 35 U.S.C. 154(b) by 97 days.

(21) Appl. No.: 17/300,585

(22) Filed: Aug. 26, 2021

Related U.S. Application Data

(60) Provisional application No. 63/103,850, filed on Aug. 27, 2020.

(51) Int. Cl.
*F04D 29/08* (2006.01)
*F16J 15/18* (2006.01)

(52) U.S. Cl.
CPC ............ *F04D 29/086* (2013.01); *F16J 15/18* (2013.01); *F16J 15/181* (2013.01)

(58) Field of Classification Search
CPC .......... F04D 29/086; F04D 29/102–146; F16J 15/18; F16J 15/181; F16J 15/183
USPC .......................................... 277/516; 415/230
See application file for complete search history.

(56) References Cited

U.S. PATENT DOCUMENTS

| | | | | | |
|---|---|---|---|---|---|
| 1,528,721 | A | * | 3/1925 | Yeip | F16J 15/18 277/510 |
| 2,037,293 | A | * | 4/1936 | Weinman | F16J 15/183 277/516 |
| 2,670,973 | A | * | 3/1954 | Ginther | F04D 29/128 277/408 |
| 2,802,679 | A | * | 8/1957 | Taltavall, Jr. | F16J 15/3496 277/408 |
| 4,342,537 | A | * | 8/1982 | Goyne | F04D 29/4273 415/230 |
| 4,386,786 | A | * | 6/1983 | Agrama | F16J 15/004 277/411 |
| 4,439,096 | A | * | 3/1984 | Rockwood | F04D 29/126 415/230 |
| 5,112,039 | A | * | 5/1992 | Walker | F16J 15/344 277/390 |
| 5,647,598 | A | * | 7/1997 | Vaudolon | F16J 15/183 277/516 |
| 6,375,414 | B1 | * | 4/2002 | Delaney | F16J 15/18 415/113 |

OTHER PUBLICATIONS

Viton Fluoroelastomers Selection Guide (Year: 2017).*

* cited by examiner

*Primary Examiner* — Devon C Kramer
*Assistant Examiner* — Joseph S. Herrmann
(74) *Attorney, Agent, or Firm* — Accelerate IP LLC

(57) ABSTRACT

A self-aligning, self-lubricated waterless-gland assembly disposed about a rotatable shaft between a process side and an atmosphere side, comprising a shaft-sleeve disposed about, contacting, and rotatable with the shaft, an annular case connected to and rotatable with the shaft-sleeve, and a stationary elastomeric boot member disposed about the shaft-sleeve, substantially filling the annular case and arranged to form a sealing interface. The waterless-gland assembly is applicable to devices whereby a fluid is movable between an inlet and an outlet.

9 Claims, 17 Drawing Sheets

WATERLESS GLAND ASSEMBLY FOR ROTATING EQUIPMENT

BACKGROUND

Rotating equipment such as pumps, compressors, blowers and similar devices are prevalent throughout a number of industries such as mining, chemical processing and commodity handling.

In one example, a centrifugal pump converts rotational kinetic energy of a component within the pump to the hydrodynamic energy of a fluid.

Specifically, an impeller is rotated by an engine, a turbine, an electric motor or the like. The impeller interacts with a fluid so as to draw the fluid into the pump at an inlet end, to accelerate the fluid as it traverses the pump, and to discharge the fluid at an outlet end.

A characteristic common to all applications is the penetration of a rotating shaft member through a housing or similar enclosure. The location where the rotating shaft penetrates the housing or enclosure provides a pathway for both egress of any lubricant or similar fluids carried by the housing or enclosure and the ingress of environmental contaminants into the housing or enclosure. One or more sealing-systems may be used to provide a shaft-seal that prevents the egress of lubricants and the ingress of contaminants.

Sealing-systems used in services that includes slurries or similar abrasive materials typically have a limited operating life, are maintenance intensive requiring weekly adjustments and use seal, flush-systems that are costly, maintenance intensive and environmentally wasteful.

The most common slurry sealing method in the mining and mineral-processing industry is compressed packing with fresh, flush-water (shown in FIG. 1), which has been used to seal pump-shafts since the 1800's. Packing consists of specifically engineered, square-braided (rope) which is placed in rings around the shaft and then compressed to reduce the leakage from the pump. The packing must be flushed with clean water to keep it cool and lubricated. Large, slurry-pumps require 2-40 gallon (7.5-150 liters) per minute of fresh, flush-water. Some mines have so depleted their local groundwater that they have needed to import water from surrounding areas. Some of this clean, flush-water enters the process liquid causing product-dilution and some of the flush-water goes down the floor drain. In addition, the slurry gradually impregnates the stuffing material and erodes the shaft-sleeve creating even larger, leakage-paths until the assembly becomes non-functional requiring that pump be taken out of service to rebuild the seal-assembly.

Accordingly, what is required is a waterless-gland assembly that effectively prevents a slurry, originating in the process-side of a pump from reaching the atmosphere-side of said pump for a period of months, and be able to do that without requiring fresh, flush-water flow or maintenance. These are the needs addressed by this inventive Waterless-gland assembly Patent.

Advantages and Objectives

One advantage of the invention in its preferred embodiments is to eliminate the need for seal flush-water.

Another advantage of the invention In Its preferred embodiments is to eliminate the need for mechanical packing adjustments.

Another advantage of the invention in its preferred embodiments is that it's a self-aligning gland design which ensures gland alignment with the pump-shaft and stuffing-box.

Another advantage of the invention in its preferred embodiments is the elimination of time-consuming installations, alignments and repacking procedures.

Another advantage of the invention in its preferred embodiments is to eliminate impellor calcification and scaling problems resulting from the introduction of a lower PH flush-water into the impellor-housing.

Another advantage of the invention in its preferred embodiments is that it installs in most slurry pumps with no modifications to OEM Equipment.

Another advantage of the invention in its preferred embodiments is that this waterless-gland assembly can withstand pump-cavitation, pressure changes, hard shut-downs and a wide range of shaft-speeds.

Another advantage of the invention in its preferred embodiments is that the waterless-gland assembly is lubricated from gland, cartridge-porting, thus eliminating the use of any porting from the OEM stuffing-box.

Another advantage of the invention in its preferred embodiments is that this waterless-gland assembly is a sealed cartridge, complete with no adjustments aside from the initial, axial-adjustment during installation.

Another advantage of the invention in its preferred embodiments is that it uses automated, grease-feeders that will provide the necessary lubrication for the gland without maintenance.

REFERENCE NUMERALS (1) Waterless-gland assembly
(2) Primary gland-body
(3) Primary shaft-sleeve
(4) Elastomeric boot
(5) Annular boot-keeper
(6) Annular boot-keeper compression-ring
(7) Primary gland-body flange
(8) Rotary, High-pressure lip-seal
(9) Boot-keeper retaining-ring
(10) Atmosphere-side alignment-bushing
(11) Process-side alignment-bushing
(12) Lantern-ring
(13) Exemplary shaft-sleeve
(14) Pressurized, fresh flush-water port
(15) Rope-packing
(16) Exemplary flush-water lantern-ring
(17) Exemplary stuffing-box bore
(18) Exemplary gland-follower
(19) Bolts
(20) Center-axis of rotation
(21) Atmosphere-side
(22) Exemplary stuffing-box fastener mating-surface
(23) Exemplary stuffing-box threaded bolt-circle
(24) Exemplary stuffing-box
(26) Exemplary Stuffing-box bore shoulder (26) mating surface
(27) Exemplary pump drive-shaft (27) annular sleeve mating-surface
(28) Exemplary Pump drive-shaft
(29) Process-Side
(30) Stuffing-box throat (slurry passage)
(31) Primary gland-body O-ring cavity
(32) Atmosphere-side alignment-bushing (32) radial-interface

(33) Primary gland-body (33) anti-rotational, shoulder-bolt cavity
(34) Annular boot-keeper (34) anti-rotational, shoulder-bolt
(35) Labyrinth-housing
(36) Primary shaft-sleeve (36) annular receptacle (radial labyrinth cavity)
(37) Axial-adjustment cavity
(38) Primary shaft-sleeve (38) compression sealing-surface
(39) Annular boot-keeper (39) anti-rotational, shoulder-bolt cavity
(40) Primary gland-body (40) bore-fitting surface
(41) Primary shaft-sleeve (41) impellor mating-surface
(42) Primary gland-body sealing-surface
(43) Lantern-ring (43) grease feedthrough-ports
(44) Process-side alignment-bushing (44) internal, mating-surface
(45) Primary, gland-body O-ring
(46) Annular boot-keeper compression-ring (46) inner, mating-surface
(48) Annular boot-keeper (48) compression-surface
(49) Annular boot-keeper (49) compression-ring, axial O-ring
(50) Labyrinth-housing, radial clearance-cavity
(51) Elastomeric-boot, radial-clearance cavity
(52) Atmosphere-side alignment-bushing (52) axial, compression-surface
(53) Waterless-gland assembly (53) process-side slurry-throat
(54) Primary gland-body flange bolt-circle
(55) Primary gland-body, threaded-bolt-circle
(56) CrN+DLC film
(57) Threaded grease-port
(58) Pressurized grease-feedthrough
(60) Lantern-ring (60) radial grease-cavity
(61) Shaft-sleeve radial-extension
(62) Primary shaft-sleeve (62) pump-shaft clearance-cavity
(63) Pump-shaft mating-surface (63) of the primary shaft-sleeve
(64) Primary shaft-sleeve atmosphere-side axial, compression-surface
(66) Primary gland-body (66) counter-bore
(67) Annular boot-keeper compression-ring (67) locating-shoulder
(68) Residual slurry-barrier cavity
*Note: Numbers 25, 47 & 65 will not be used*

BRIEF DESCRIPTION OF THE DRAWINGS

Features and advantages of various embodiments of the claimed subject matter will become apparent as the following detailed description proceeds, and upon reference to the drawings, wherein like numerals designate like parts and in which:

DETAILED DESCRIPTION OF THE INVENTION

In accordance with the first preferred embodiment, a rotary sealing system comprising a non-traditional sealing design useful for preventing leakage along a rotating shaft, is disclosed in conjunction with FIGS. 1-17B While aspects of the embodied cartridge type slurry scaling system may be realized in a variety of sealing systems, it is found in the present invention that certain preferred features and manufacturing methods are used to provide a superior sealing system.

Figure 1:
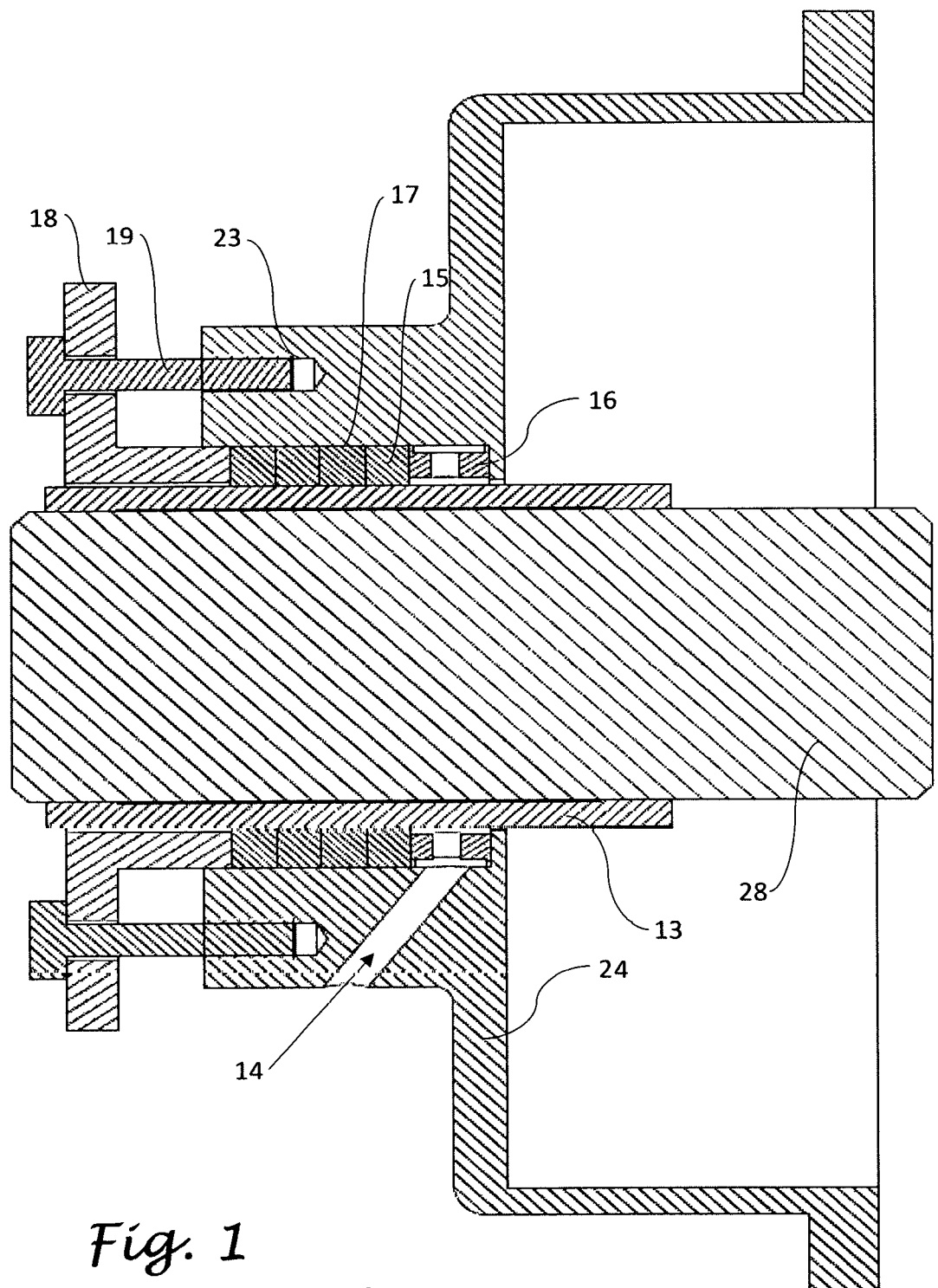
FIG. 1 is a side-sectional view of the prior art illustrating a conventional, compressed mechanical rope packing seal using fresh flush water.

In a side-sectional view shown in FIG. 1 of a prior art slurry seal assembly shows a exemplary shaft-sleeve (13) rotating with a exemplary, pump drive-shaft (28) about a center-axis of rotation (20) as it protrudes thru a stationary, exemplary stuffing-box (24). A exemplary, stuffing-box bore (17) further contains a rope-packing (15) that is compressed in a bore using bolts (19) that thread into a complementary, exemplary stuffing-box threaded bolt-circle (23) and adjust a exemplary gland-follower (18) to mechanically compress the rope-packing (15) in the exemplary stuffing-box bore (17) to create a seal in the inner bore against slurry arriving from a processing-side (29) as practiced by those skilled in the art. The prior art FIG. 1 also includes a pressurized, flush-water porting (14) to introduce pressurized water through a exemplary, flush-water lantern-ring (16) to the processing-side (29) of the rope-packing (15).

Figure 2:
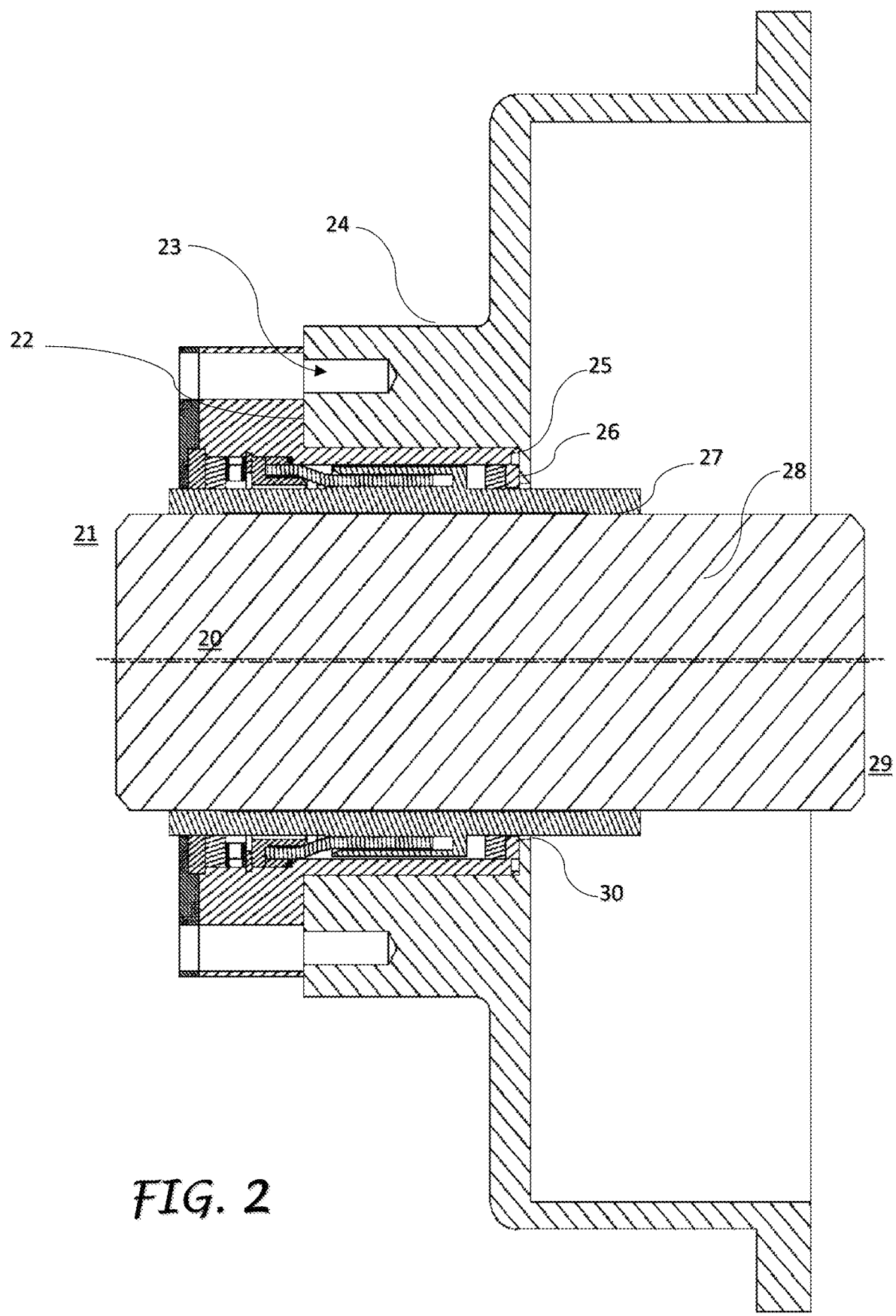
FIG. 2 is a side-sectional view of the prior art/exemplary stuffing box shown with an inventive waterless-gland assembly provided in accordance with the invention in a first preferred embodiment.

In FIG. 2 a waterless-gland assembly (1) in its preferred embodiment, is shown replacing the prior art seal assembly in FIG. 1. The drop-in waterless-gland assembly (1) uses multiple interface design options when interfacing with a wide variety of OEM pumps and is particularly suitable for, but not limited to, service with OEM pump manufacturers such as: KREBBS/FL SCHMIDT, WIER, ASH, WORMAN, GIW and GOULD.

Referring now to FIGS. 2, 3, 4, 5, and 6, In the first preferred embodiment shows the waterless-gland assembly (1) comprising a modular assembly adapted to an exemplary pumping system and is preferably adapted to an in-field, existing, on-site slurry pumping system. The modular waterless gland assembly (1) comprises custom-fabricated, numerous components disposed in a preferably annular assembly for sealing the customer-provided, exemplary, pump drive-shaft (28) and associated exemplary stuffing-box (24).

Referring to FIGS. 2, 3 and 7A and 7B the waterless-gland assembly (1) is interfaced to a exemplary stuffing-box bore (17) with a primary gland-body, bore-fitting surface (40) and uses a primary shaft-sleeve (3) which is rigidly coupled to the exemplary, pump drive-shaft (28) about the center-axis of rotation (20). In a first preferred embodiment, critical portions of the outside diameter on the primary shaft-sleeve (3) are preferably coated with a hard coating, and more preferably a diamond-like film (CrN+DLC) (56) to provide durable, low-friction sealing surfaces.

Figure 3:
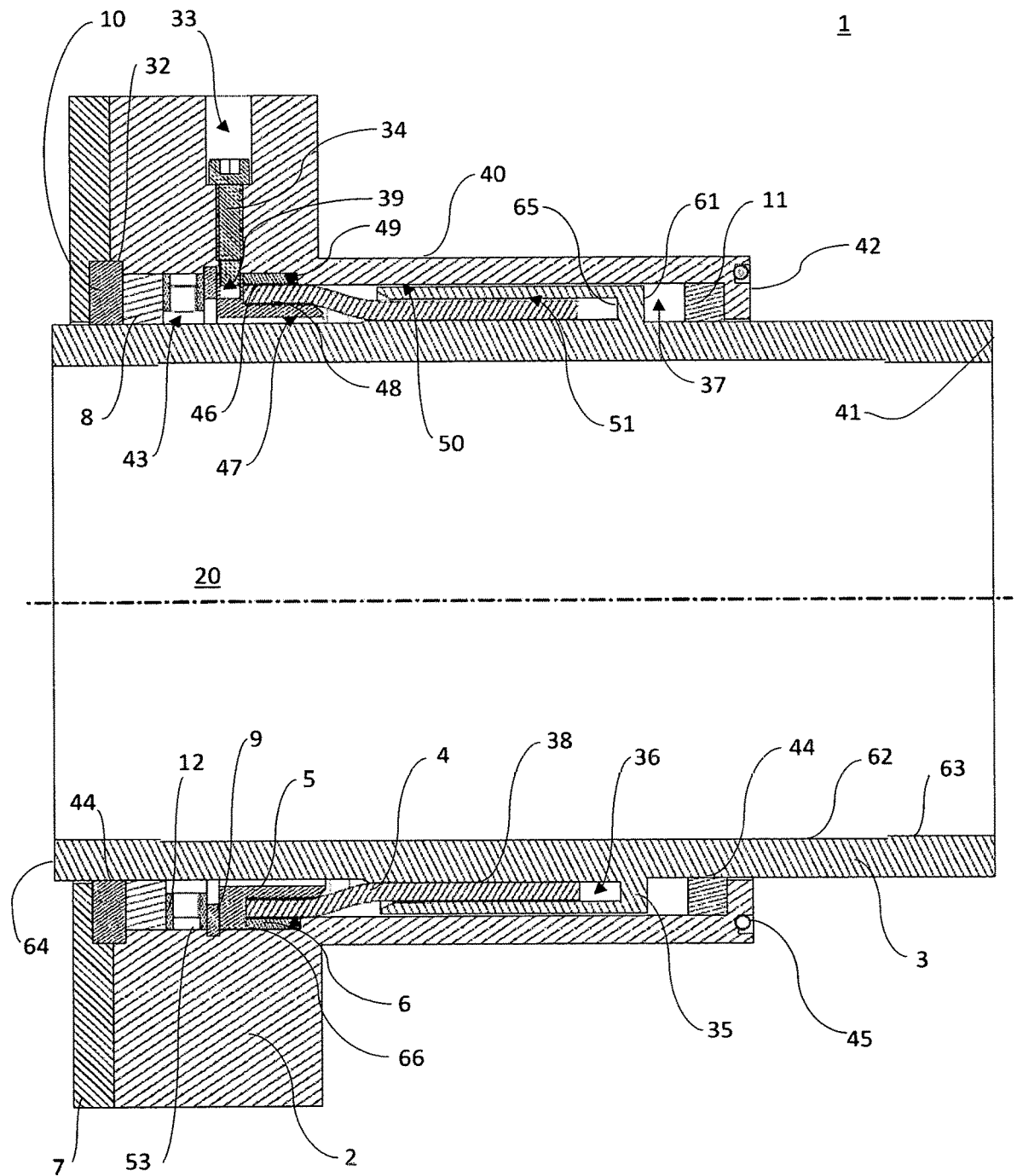
FIG. 3 is a side-sectional view of the invention wherein a waterless-gland assembly is provided in accordance with the invention in a first preferred embodiment.
Figure 4:
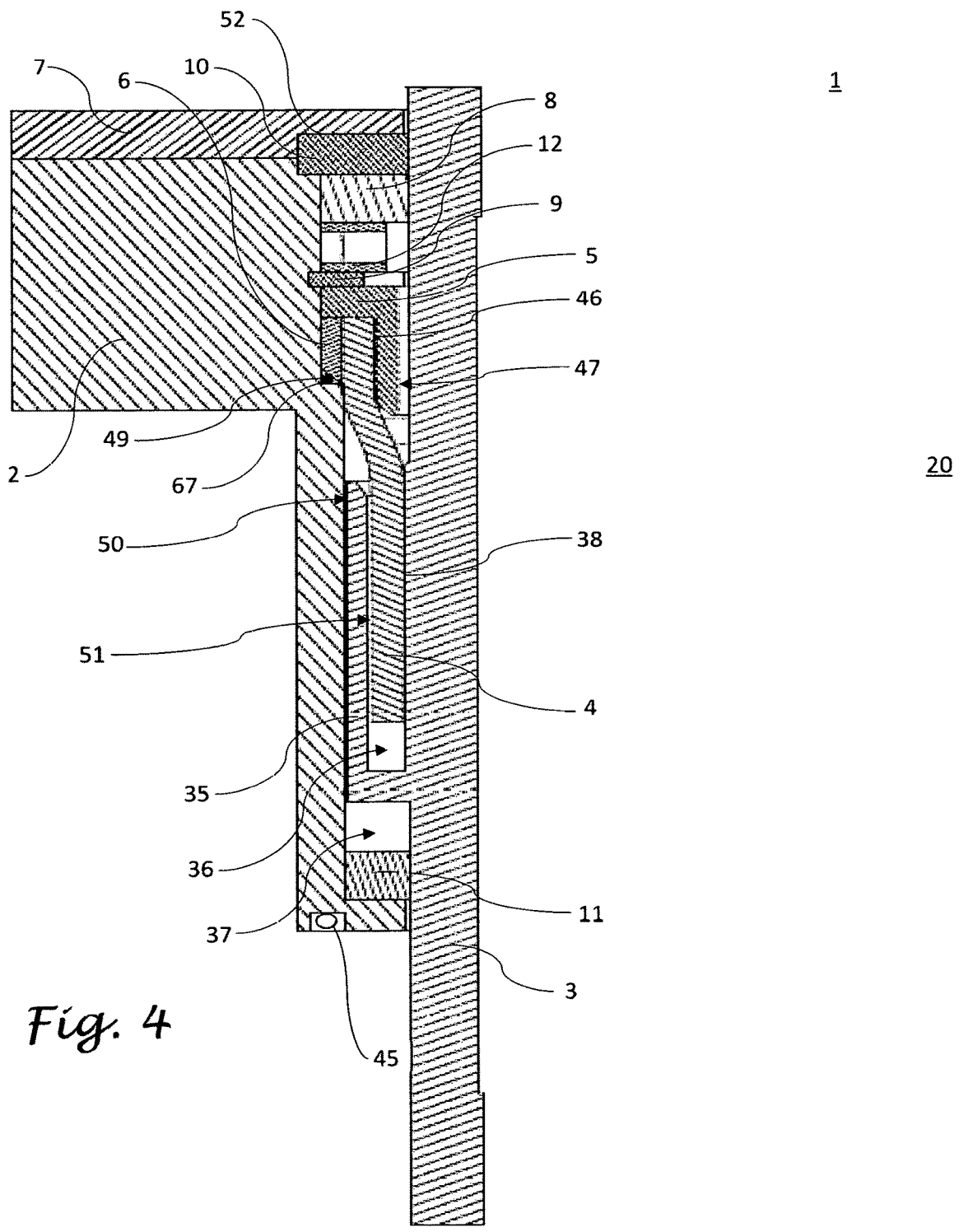
FIG. 4 is a symmetrical side-sectional view of the invention wherein a waterless-gland assembly is provided in accordance with the invention in a first preferred embodiment.

Referring now to FIGS. 1, 2 and 3, the waterless-gland assembly (1) is adapted as an assembly to the existing exemplary pump drive-shaft (28) by radially joining a primary shaft-sleeve, pump-shaft, mating-surface (63) to a exemplary pump drive-shaft annular, shaft-sleeve mating-surface (27) and having a tight, slip-fit radial-tolerance. Accordingly, a primary shaft-sleeve, pump-shaft clearance-cavity (62) provides bore-fitting relief for ease of installation. The waterless gland assembly (1) is typically adapted so as to be directly interchangeable with a pre-existing slurry seal or rope packing. The waterless-gland assembly (1) is accordingly constructed so as to be dimensionally fitted within these pre-existing exemplary stuffing-box (24) surfaces: the exemplary stuffing-box bore (17), a exemplary, stuffing-box fastener mating-surface (22) and a exemplary stuffing-box bore shoulder (26). Once the waterless-gland assembly (1) is mated with the exemplary stuffing-box (24) it cannot be readily displaced from its resting position without a substantial force due to the plurality of bolts (19) fastening the waterless-gland assembly (1) to the stuffing-box threaded bolt-circle (23), as is commonly practiced by those skilled in the art. The primary gland-body (2) preferably, comprises a monolithic form but can be constructed of multiple interconnected pieces in an alternative embodiment. The primary components of the waterless gland assembly (1) are preferably formed from 316 or 304 stainless steel to prevent corrosion during operation Referring again to FIGS. 2, 3, 7A and 7B a primary gland-body O-ring (45) is disposed into a primary gland body, O-ring cavity (31) of a primary gland-body (2), and will mate with the exemplary, stuffing-box bore-shoulder mating surface (26). The clearance between a primary, gland-body, sealing-surface (42) and the bore shoulder mating-surface (26) is a resistance fit so as to hermetically seal the base of the primary gland-body (2) to the bore shoulder (26) thereby occluding the passage of slurry fluid between the waterless-gland assembly (1) and the exemplary, stuffing box bore (17).

For purpose of the present application, the term "slurry" is understood to include liquids with or without particles capable of wearing the sealing surfaces. The slurry inherently comprises exceedingly abrasive mixtures that are frequently encountered in mining operations for which the presently embodied waterless-gland assembly (1) is well-suited.

Referring now to FIGS. 2, 8A, 8B and 8C a waterless-gland assembly (1) is shown disposed about the rotatable, exemplary, pump drive-shaft (28) between the process-side (29) and a atmosphere-side (21) of the pump sealing area. The primary shaft-sleeve (3) is a cylindrical structure attached to the exemplary, pump drive-shaft (28) by axial compression enabling the primary shaft-sleeve (3) to rotate with the exemplary, pump drive-shaft (28) about the center-axis of rotation (20).

Referring again to FIGS. 2, 3, 8A, 8B and 8C the primary shaft-sleeve (3) is axially located and secured to the exemplary pump shaft (28) in a using a primary shaft-sleeve atmosphere-side, axial, compression-surface (64) and a primary shaft-sleeve, impellor, mating-surface (41) which ensures the proper location and registration of the waterless-gland assembly (1) in an OEM pumping system. Rotation may be either clockwise or counter clockwise as required and suitable for the application.

Referring again to FIG. 2, the exemplary pump, drive-shaft (28) may be attached to or communicable with a motor or other drive means (not shown) at the atmosphere-side (21). The exemplary pump, drive-shaft (28) also may be attached to a component facilitating transport of a slurry between input and output ends at the process-side (29). In one example, the waterless-gland assembly (1) could be disposed along the exemplary pump, drive-shaft (28) within a slurry pump whereby the exemplary pump, drive-shaft (28) is attached at the atmosphere-side (21) to an electric or gas-powered motor internal or external to the pump and the process-side (29) to an impeller.

Now referring to FIGS. 2, 3, 15A, 15B, 16A and 16B the waterless-gland assembly (1) alignment is ensured between the waterless-gland assembly (1), the exemplary pump, drive-shaft (28) and the exemplary stuffing-box (24) by means of a process-side alignment-bushing (11) and a atmosphere-side alignment-bushing (10). The process-side alignment-bushing (11) is press-fit in the primary gland-body (2) in assembly, preventing rotation of the bushing during pump operation. Accordingly, a process-side alignment-bushing internal mating-surface (44) will wear, allowing some flow of slurry to enter the waterless-gland assembly (1) from the process-side (29) through a stuffing-box throat (slurry passage) (30) into a axial-adjustment cavity (37).

Figure 5:
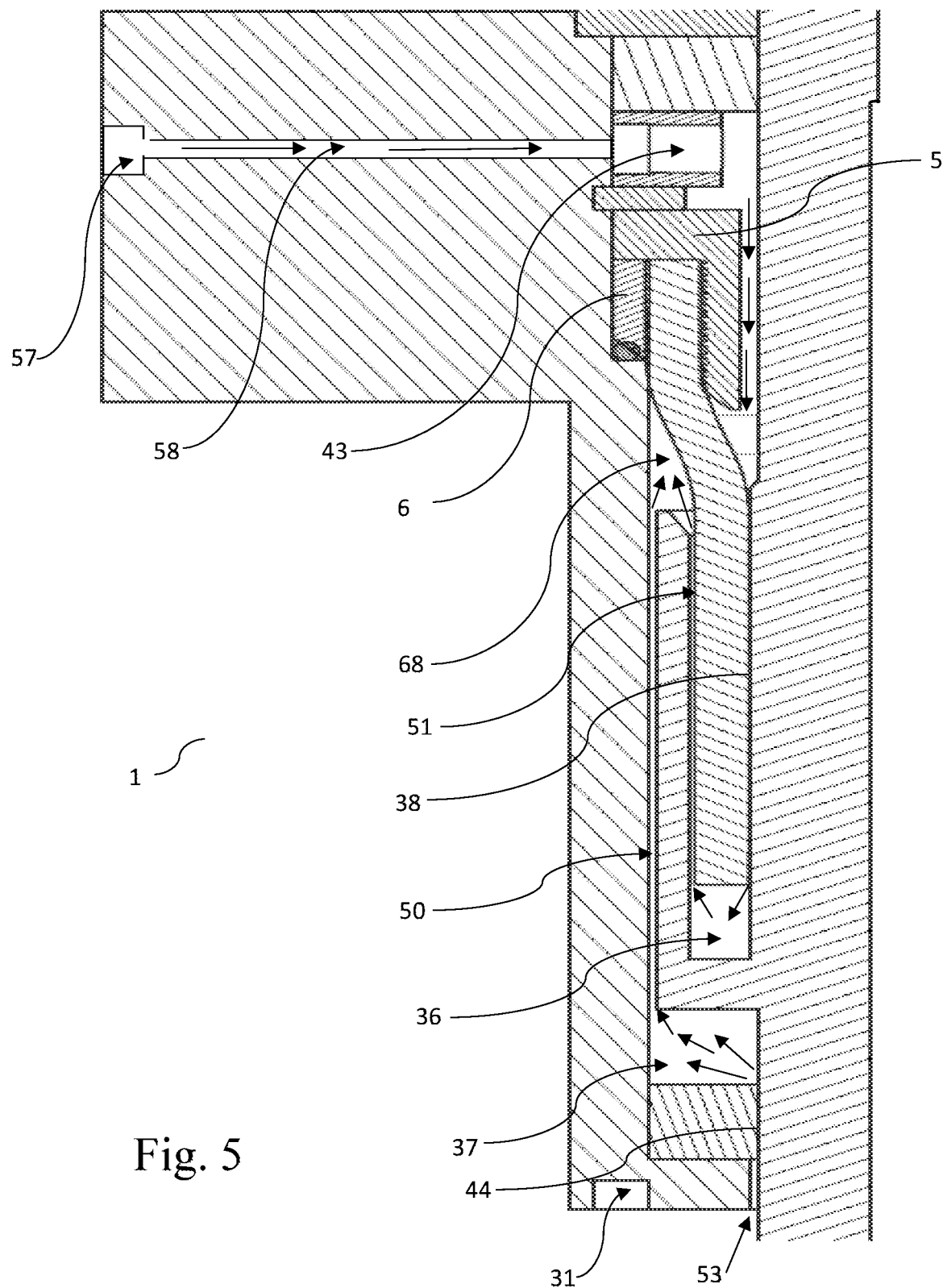
FIG. 5 is a symmetrical side-sectional view of the invention wherein a slurry flow is described in combination with the flow of the internal lubrication in the waterless-gland assembly in its preferred embodiment.
Figure 6:
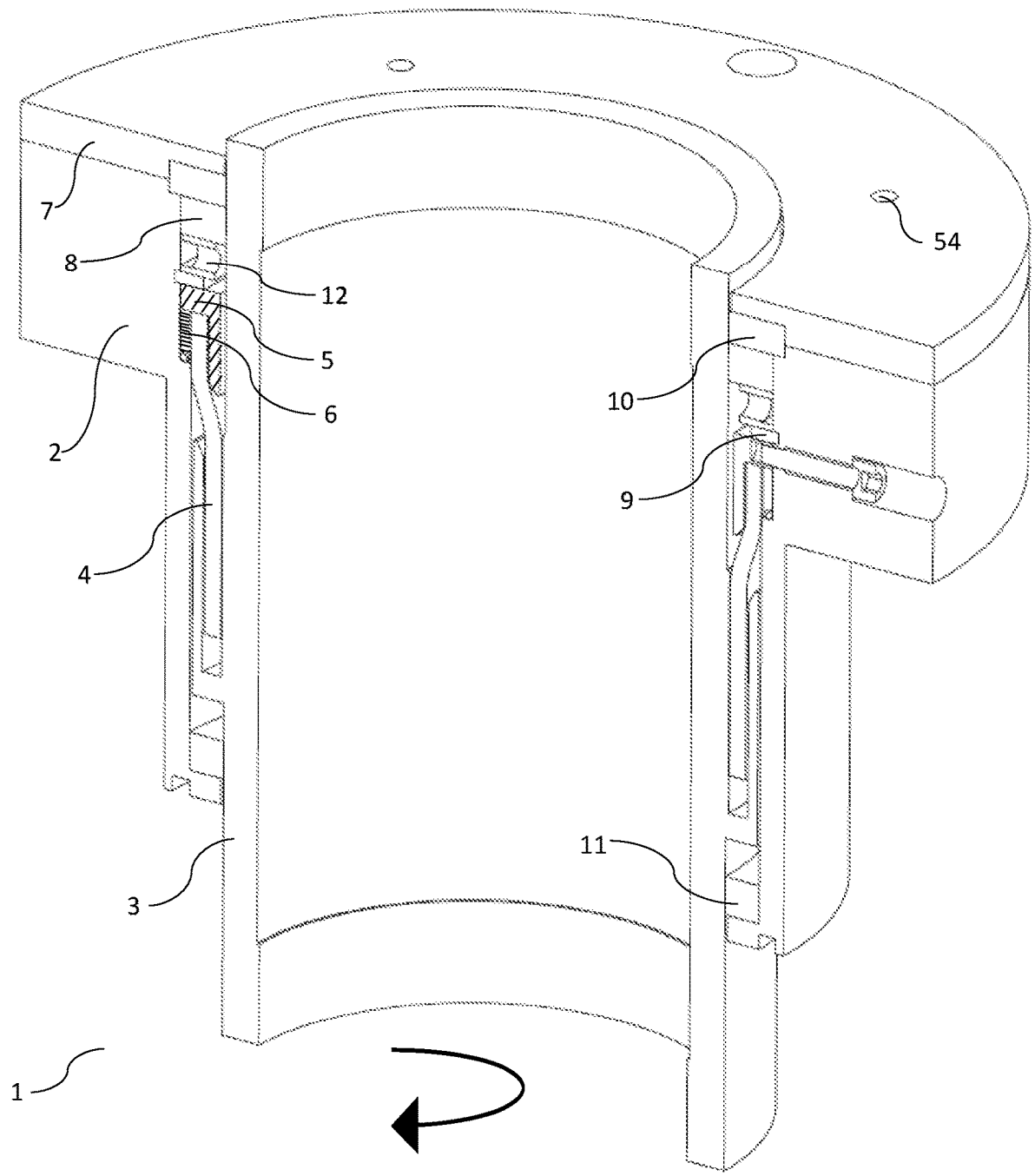
FIG. 6 is a perspective side-sectional view of the invention wherein a waterless-gland assembly is provided in accordance with the invention in a first preferred embodiment.
Figure 7A:
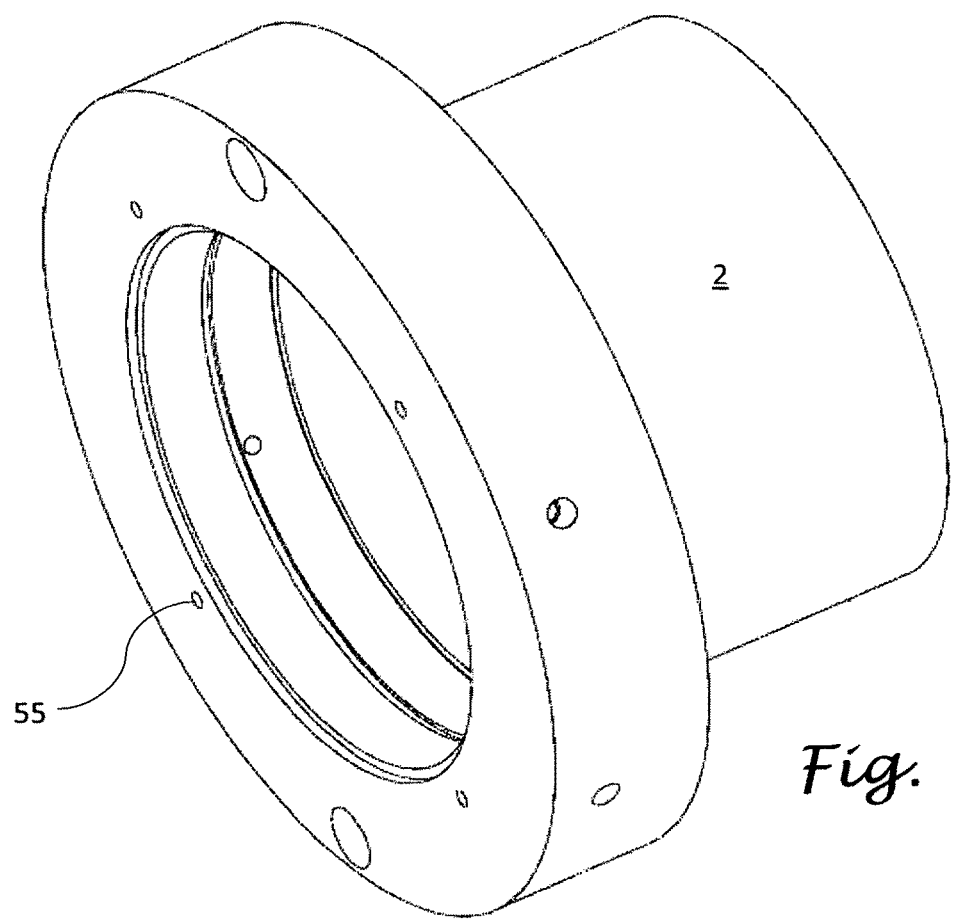
FIG. 7A is a perspective view of a primary gland body of the invention in its first preferred embodiment.
Figure 7B:
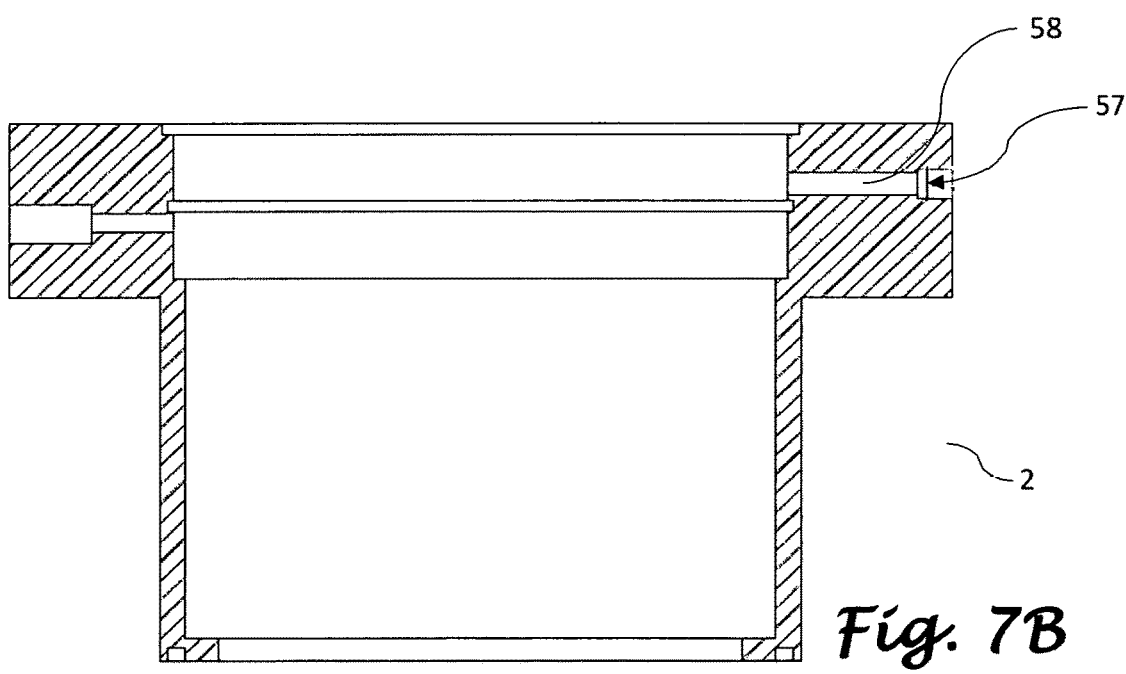
FIG. 7B is a side-sectional view of a primary gland body of the invention in its first preferred embodiment.
Figure 8A:
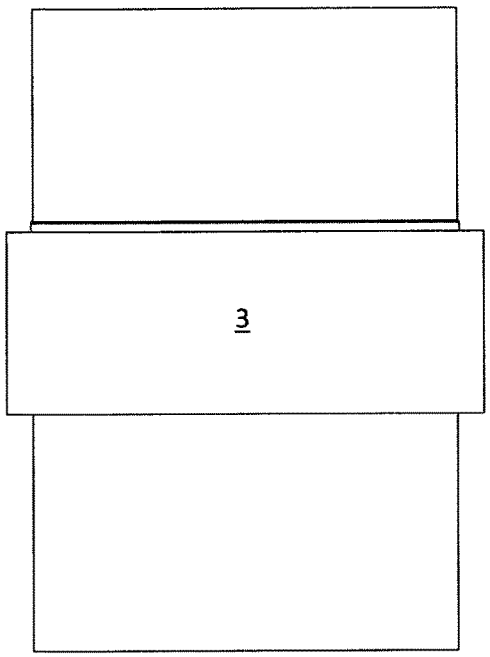
FIG. 8A is a side view of a primary shaft sleeve of the invention in its first preferred embodiment.
Figure 8B:
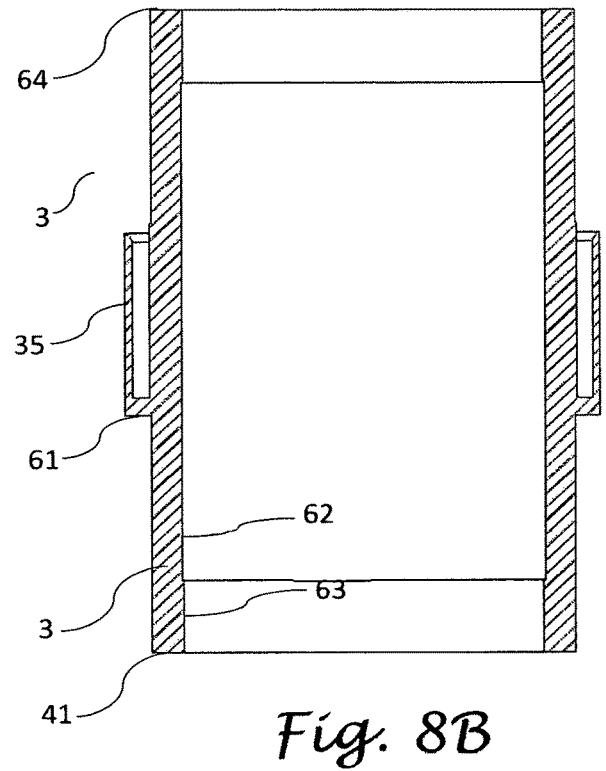
FIG. 8B is a side-sectional view of a primary shaft sleeve of the invention in its first preferred embodiment.
Figure 8C:
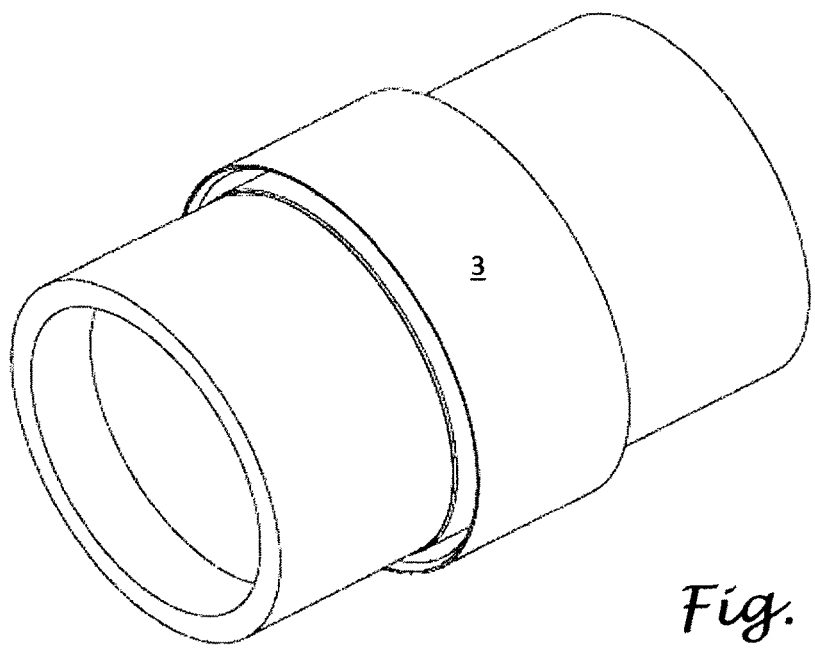
FIG. 8C is a perspective view of a primary shaft sleeve of the invention in its first preferred embodiment.
Figure 9A:
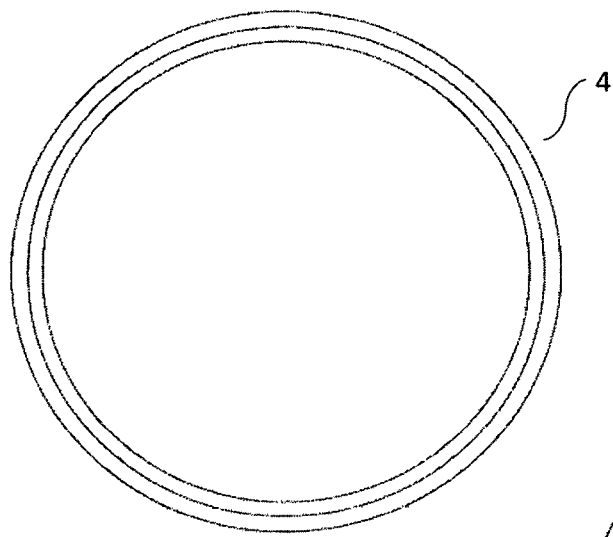
FIG. 9A is a top view of an elastomeric boot of the invention in its first preferred embodiment.
Figure 9B:
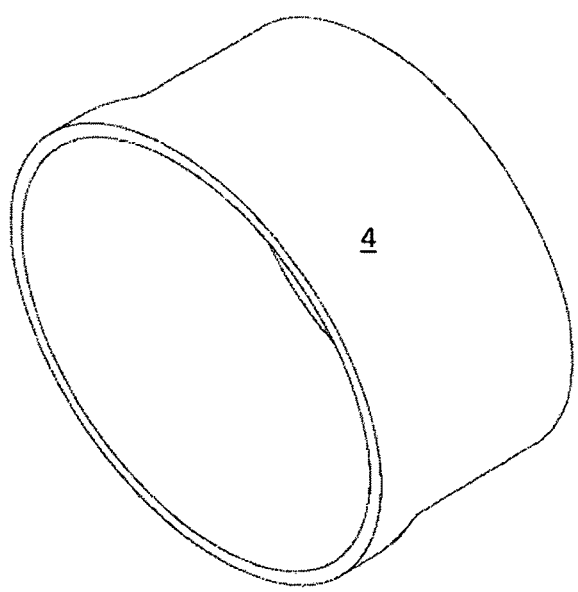
FIG. 9B is a perspective view of an elastomeric boot of the invention in its first preferred embodiment.
Figure 9C:
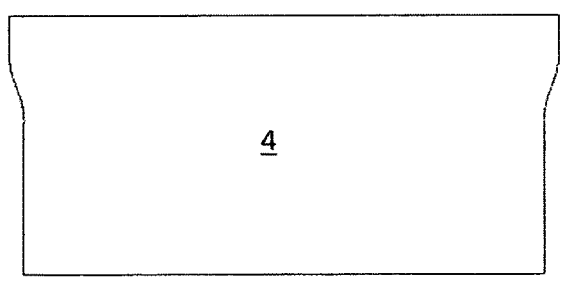
FIG. 9C is a side view of an elastomeric boot of the invention in its first preferred embodiment.
Figure 10A:
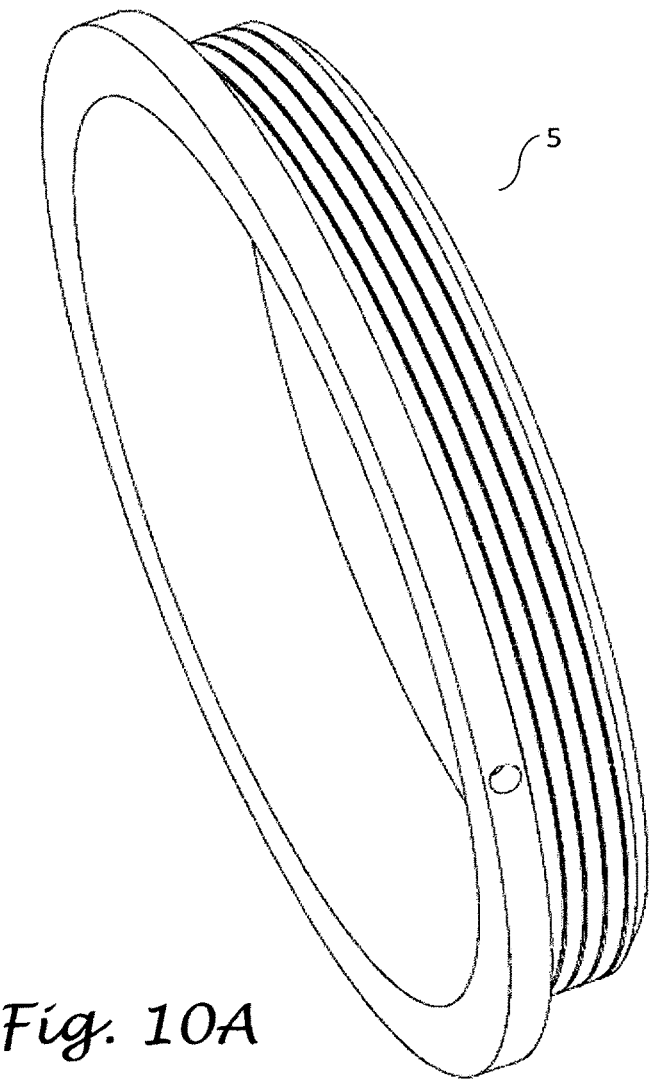
FIG. 10A is a perspective view of an annular boot-keeper of the invention in its first preferred embodiment.
Figure 10B:
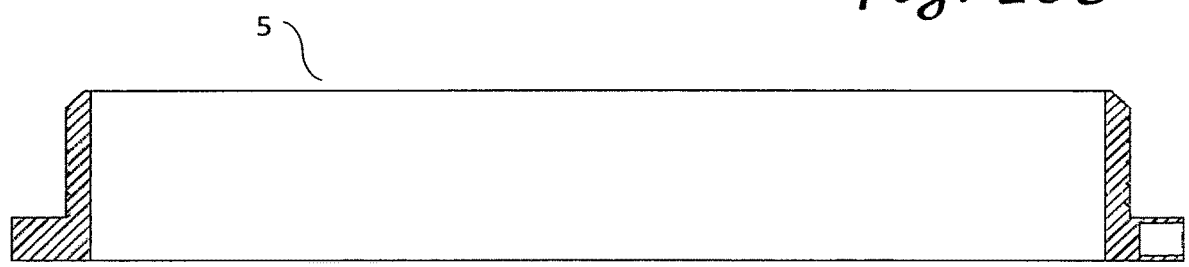
FIG. 10B is a side-sectional view of an annular boot-keeper of the invention in its first preferred embodiment.
Figure 11A:
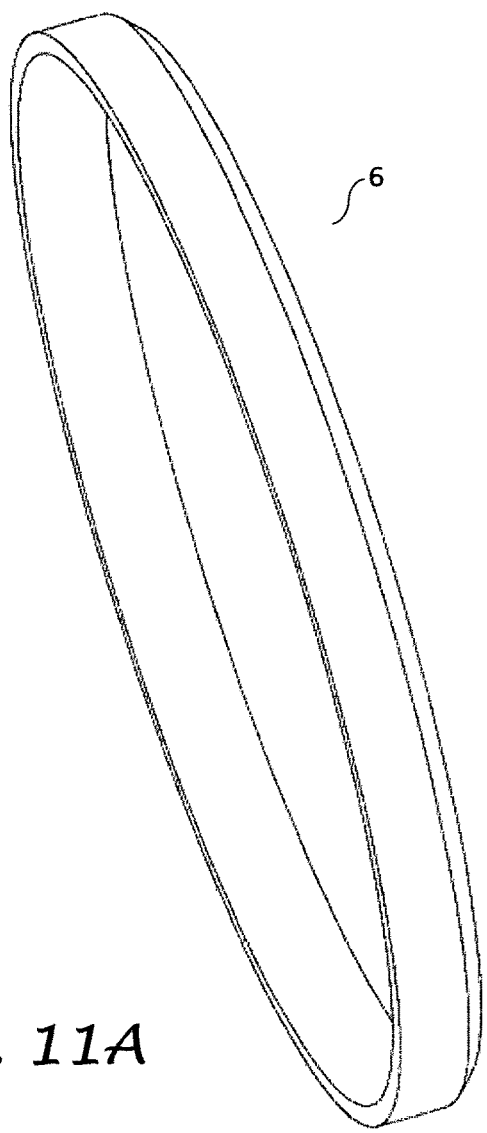
FIG. 11A is a perspective view of a boot-keeper annular boot-keeper compression ring of the invention in its first preferred embodiment.
Figure 11B:
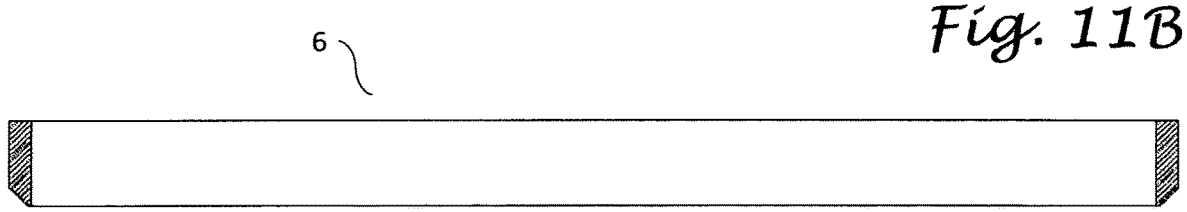
FIG. 11B is a side-sectional view of a boot-keeper annular boot-keeper compression ring of the invention in its first preferred embodiment.
Figure 12A:
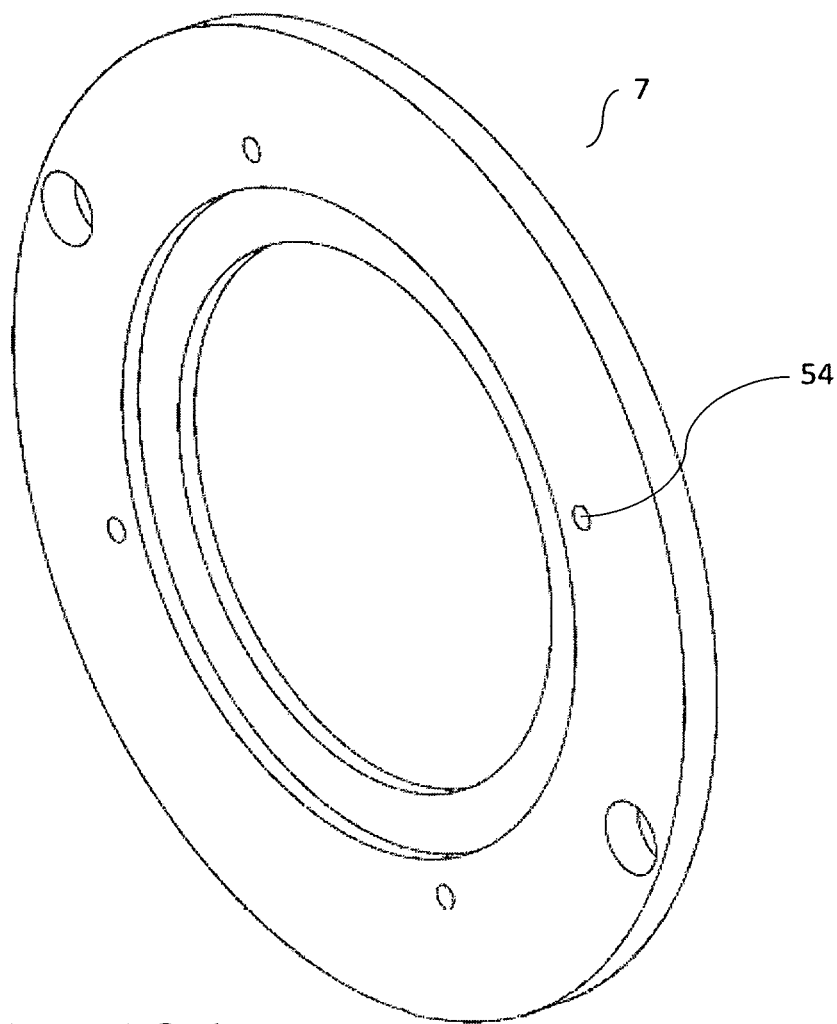
FIG. 12A is a perspective view of a primary gland body flange of the invention in its first preferred embodiment.
Figure 12B:
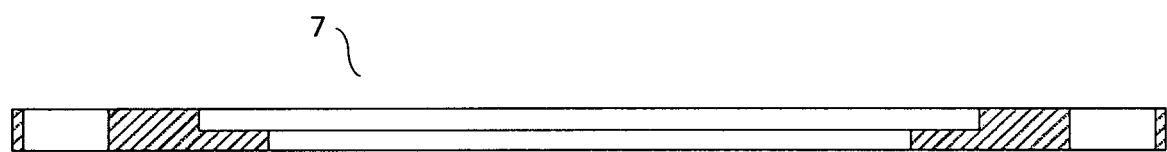
FIG. 12B is a side-sectional view of a primary gland body flange of the invention in its first preferred embodiment.
Figure 13A:
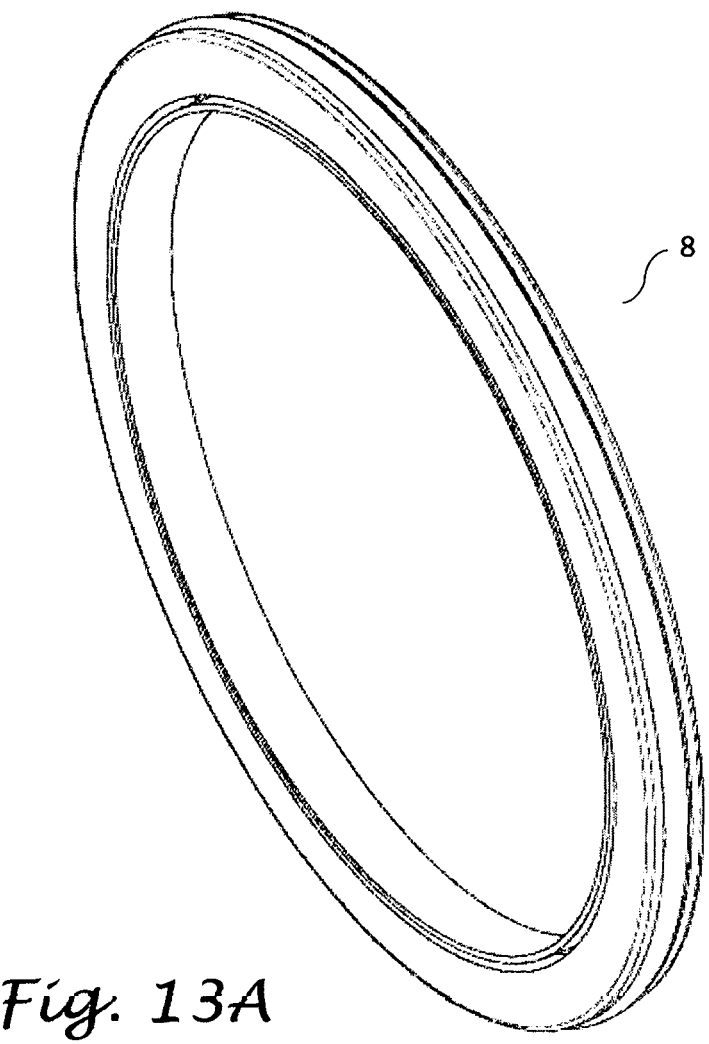
FIG. 13A is a perspective view of a rotary high-pressure lip seal of the invention in its first preferred embodiment.
Figure 13B:
FIG. 13B is a side-sectional view of a rotary high-pressure lip seal of the invention in its first preferred embodiment.
Figure 14A:
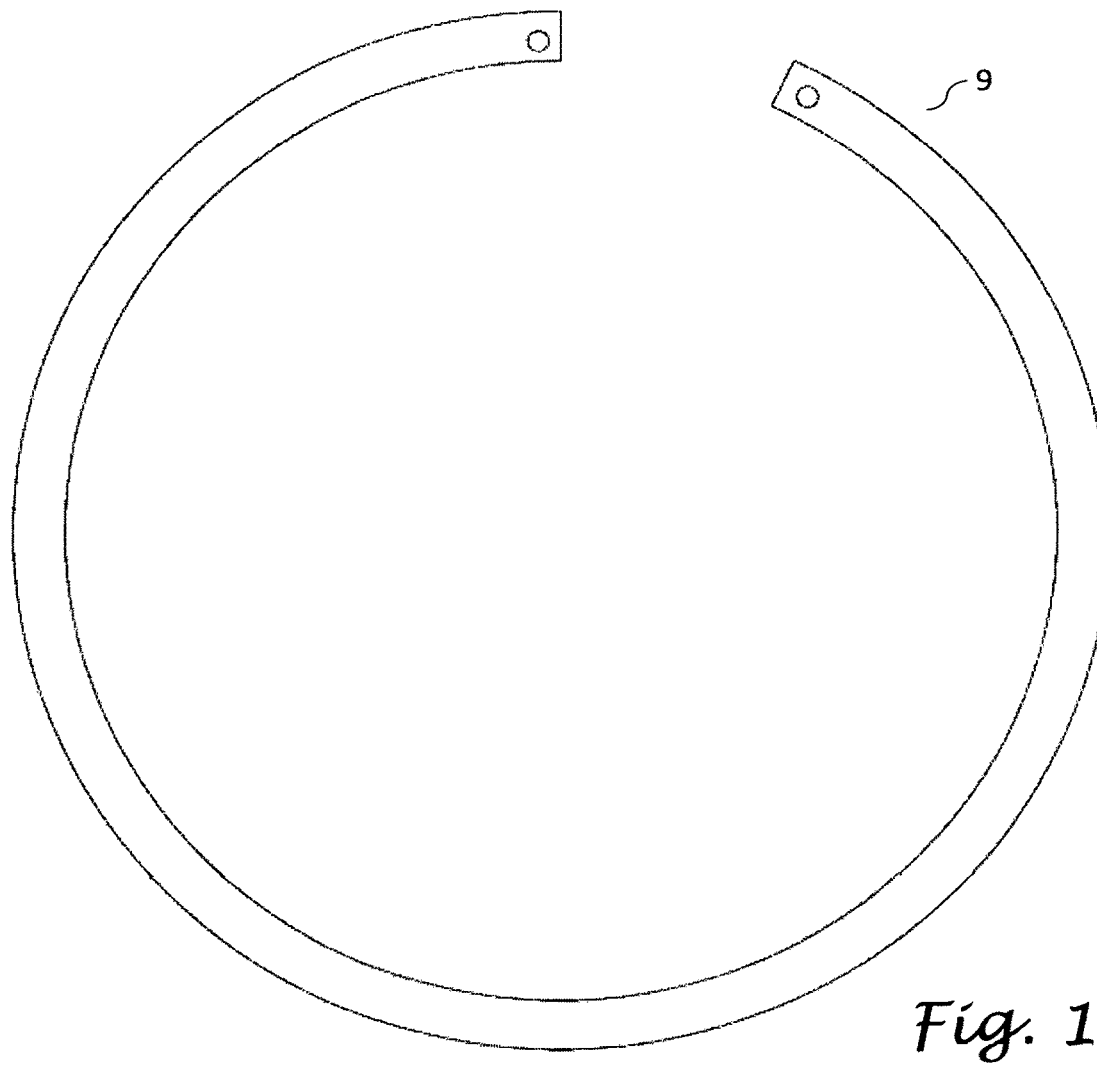
FIG. 14A is a top view of a boot-keeper retaining ring of the invention in its first preferred embodiment.
Figure 14B:
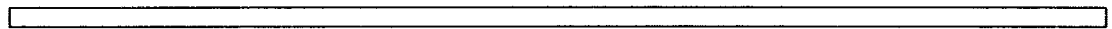
FIG. 14B is a side view of a boot-keeper retaining ring of the invention in its first preferred embodiment.
Figure 15A:
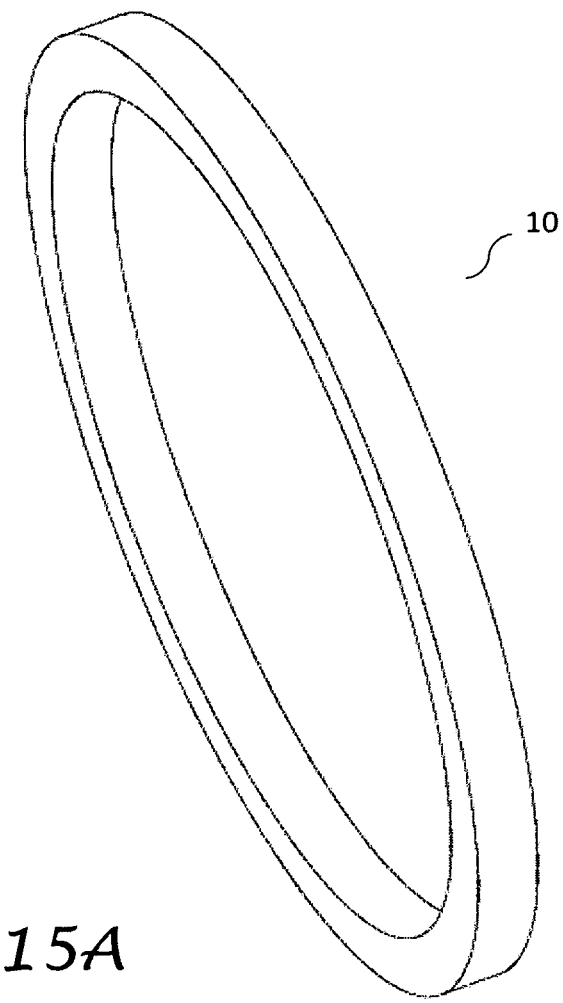
FIG. 15A is a perspective view of an atmosphere side alignment bushing of the invention in its first preferred embodiment.
Figure 15B:
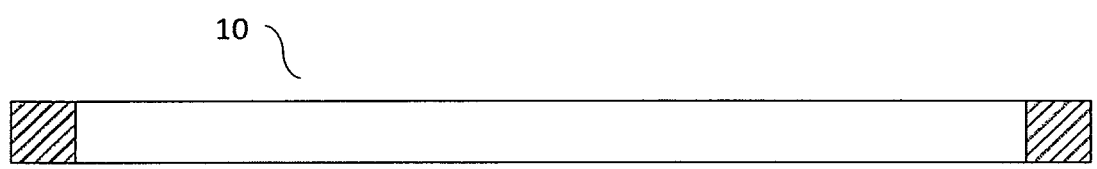
FIG. 15B is a side-sectional view of an atmosphere side alignment bushing of the invention in its first preferred embodiment.
Figure 16A:
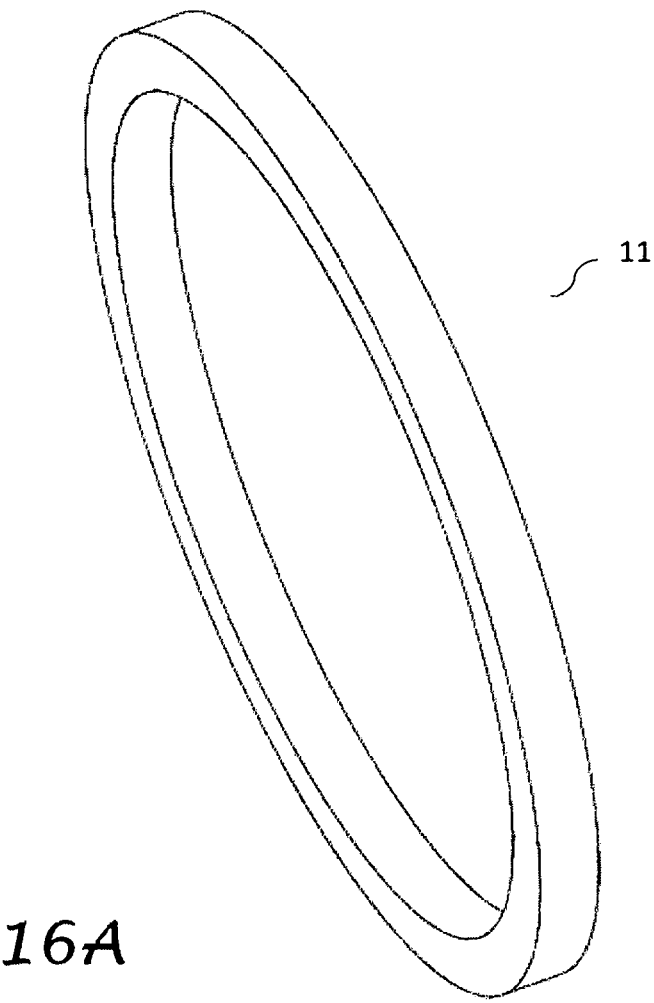
FIG. 16A is a perspective view of a process side alignment bushing of the invention in its first preferred embodiment.
Figure 16B:
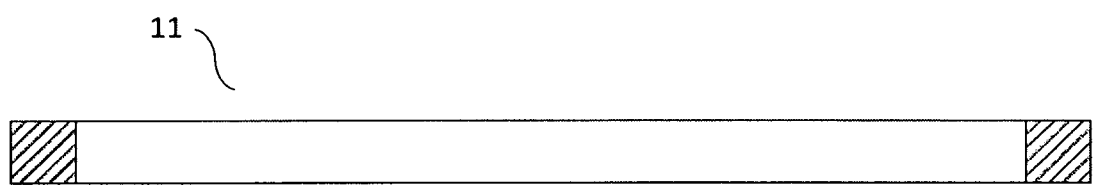
FIG. 16B is a side-sectional view of a process side alignment bushing of the invention in its first preferred embodiment.
Figure 17A:
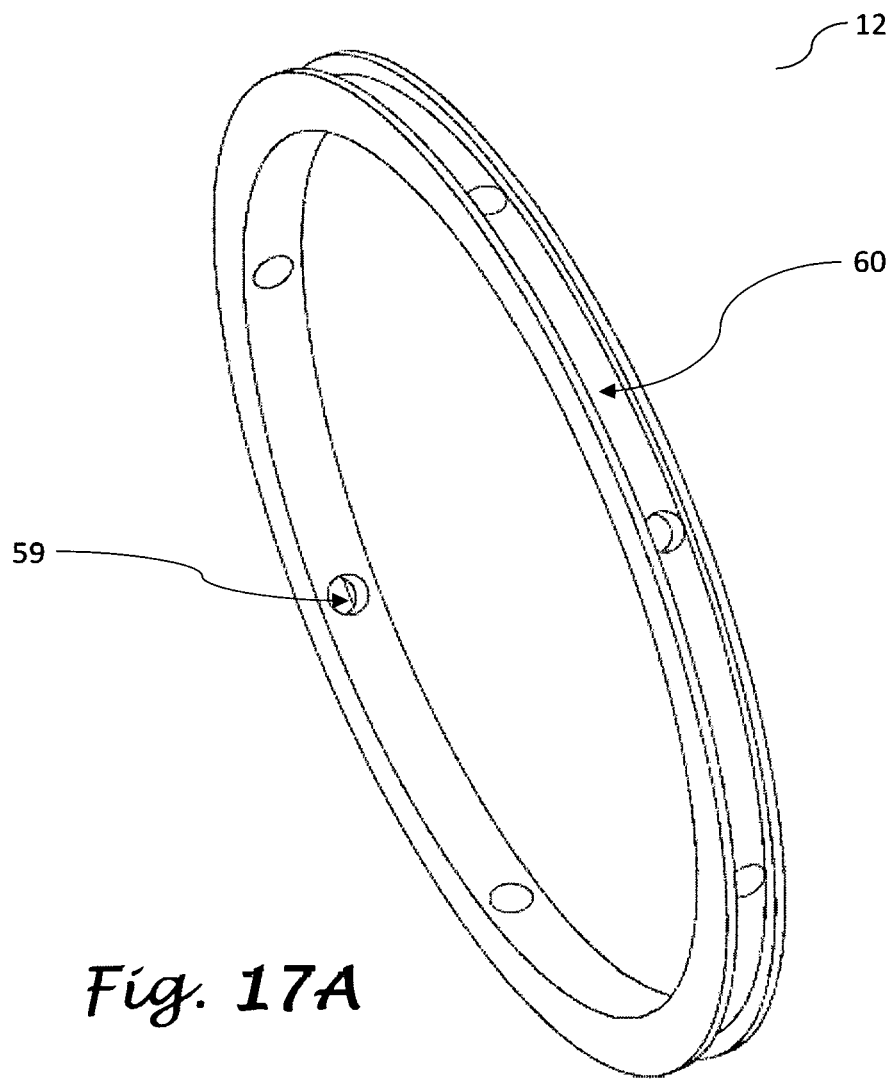
FIG. 17A is a perspective view of a lantern ring of the invention in its first preferred embodiment.
Figure 17B:
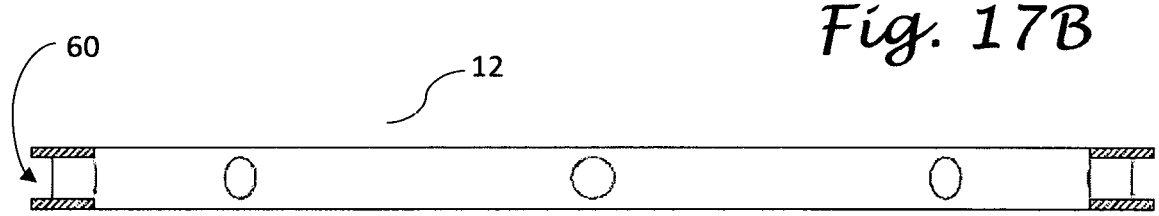
FIG. 17B is a side-sectional view of a lantern ring of the invention in its first preferred embodiment.

Referring now to FIGS. 2 and 5 For purpose of the present application, the term "chamber" encompasses and describes the entirety of all cavities, gaps and voids between a threaded grease-port (57) and the process-side (29) of the waterless-gland assembly (1). The entire chamber of the waterless-gland assembly (1) is substantially purged with grease and will continue to be replenished with grease throughout the lifespan of the waterless-gland assembly (1) from the grease dispensing unit (not shown), which may be a gas-charged, electromechanical or spring-loaded automatic grease dispensing unit providing an inclusive means by which to lubricate the waterless-gland assembly (1) with metered injections; eliminating the need for manual lubrication and maintenance.

Referring now to FIGS. 3, 4, 6, 7A, 7B, 8A, 8B, 8C, 12A, 12B, 13A, 13B, 15A, 15B, 16A and 16B the primary gland body flange (7) provides axially compression to a atmosphere-side alignment-bushing axial compression-surface (52) of the atmosphere-side alignment-bushing (10) thereby preventing the rotation or axial movement of the alignment bushing (10). The primary gland-body flange bolt-circle (54) is fastened to the primary gland-body (2) using the primary gland-body threaded bolt-circle (55) via a plurality of fasteners. Accordingly, atmosphere-side alignment bushing is radially defined by a atmosphere-side alignment-bushing radial-interface (32).

The bushings (10,11) also establish concentricity and radial alignment between a rotary, high-pressure lip-seal (8) and the primary shaft-sleeve (3) eliminating side-loading during operation about the center-axis of rotation (20). Accordingly, said alignment bushings provide alignment between the gland body (2) and the shaft sleeve (3) that is maintained once the exemplary stuffing-box (24) is secured by a plurality of fasteners to the process-side (29) impellor housing (not shown) during installation.

Referring again to FIGS. 2, 3, 4, 6, 7A, 7B, 9A, 9B, 9C, 10A, 10B, 11A, 11B, 14A and 14B, a elastomeric boot (4), a single, homogeneous, elastomeric member, in its first preferred embodiment, is captured by its internal diameter on its atmosphere end by a annular boot-keeper compression surface (48) of the annular boot-keeper (5) providing a radially engaging, stretch-to-fit surface and compressed on its outside diameter to the annular boot-keeper (5) with a annular boot-keeper compression ring inner mating surface (46) of a annular boot-keeper compression ring (6) providing radial compression, whereby, friction-locking the elastomeric boot (4) between these two components, composing a boot capturing assembly (labyrinth keeper). The labyrinth keeper is bore fitted to a primary gland-body counter-bore (66) of the primary gland-body (2) and axially located by a annular boot-keeper compression-ring locating-shoulder (67) hermetically sealing the boot keeper assembly against the passage of slurry from the process-side (29) using a annular boot-keeper compression-ring, axial O-ring (49).

Accordingly, the annular boot-keeper (5) is axially retained and affixed by a boot-keeper retaining ring (9) which also provides compression for the compression ring axial O-ring (49). The annular boot-keeper (5) is also secured in rotation in the counterbore (66) by a annular boot-keeper anti-rotational shoulder-bolt (34) which is affixed to the primary gland-body (2) by engaging the anti-rotational shoulder bolt (34) in a primary gland-body, anti-rotational, shoulder-bolt cavity (33) and substantially filling a annular boot-keeper, anti-rotational, shoulder-bolt cavity (39). The elastomeric boot (4) is captured by the annular boot-keeper (5) in assembly and is now provided with radial and axial alignment.

Referring now to FIGS. 3, 6, 8A, 8B, 8C, 9A, 9B and 9C, the primary shaft-sleeve (3) is formed with a labyrinth-housing (35) comprising a cylindrical wall that is spaced away from a primary shaft-sleeve compression sealing-surface (38), a shaft-sleeve radial-extension (61) and joined to the primary shaft-sleeve (3), creating between them a shaft sleeve annular receptacle (labyrinth cavity) (36). The radially collapsible elastomeric boot (4) is interposed in and substantially filling the annular receptacle (36) and having a radial compressive force about the sealing-surface (38).

Referring now to FIGS. 2, 3, 4, 5, 17A and 17B at least one pressurized grease-feedthrough channel (58) communicates with a grease dispensing unit at the atmosphere-side (21) which purges all of the inner chamber's cavities, gaps and voids with grease or other viscous, water-insoluble material. The pressurized grease traverses through a lantern-ring grease feedthrough-ports (43) and through a lantern-ring, radial grease-cavity (60) of a lantern ring (12) filling the entire chamber of the waterless-gland assembly (1) to the process-side (29). The rotary, high-pressure lip-seal (8) prevents the passage of the grease to the atmosphere-side (21). In its preferred embodiment, the grease pressure is higher than the pressure within the process-side (29) so as to impede the slurry's upstream flow from the process-side (29) to the atmosphere-side (21).

Referring now to FIGS. 2, 3, 4, 5, 6, 9A, 9B and 9C, the axial-adjustment cavity (37) of the waterless-gland assembly (1) provides the necessary axial movement during installation to ensure proper mechanical clearances and accordingly acts as a cavity, wherein, the grease and slurry particulates combine in a process that creates a clotting effect through the grease's ability to separate the slurry particulates from the carrying liquid due to the grease's resistance to water washout. This combination of grease and slurry particulates will form a compound that creates a restrictive barrier further impeding upstream flow by the slurry from the stuffing-box throat (slurry passage) (30) and a waterless-gland assembly process-side slurry throat (53) towards the atmosphere-side (21) of the waterless-gland assembly (1). The portion of slurry that continues past the axial-adjustment cavity (37) towards the atmosphere-side (21) is significantly reduced in flow and volume due to the restrictive gap of a labyrinth-housing, rotational clearance-cavity (50), preferably, less than 0.030" radially. The remaining, residual portion of slurry that traverses the labyrinth-housing, rotational clearance-cavity (50) will enter a residual, slurry-barrier cavity (68). Additionally, a elastomeric-boot, radial-clearance cavity (51) communicates a pressurized grease medium from the atmosphere-side (21) to further prevent the upstream flow by the residual slurry material originating from the process-side (29). The labyrinth effect created by the elastomeric boot (4) in a constant radially compressive force with the compression sealing surface (38) and integrated into the annular receptacle (labyrinth cavity) (36) will prevent the remaining slurry from further traversing toward the atmosphere-side (21) of the waterless-gland assembly (1).

Referring again to FIGS. 1, 2, and 3, the lubrication pressure from the atmosphere-side (21) and tolerances between internal components of the waterless-gland assembly (1) required to resist flow of slurry from the process-side (29) are application dependent and based on a variety of factors including but not limited to; the density, composition, velocity and pressure within the process-side (29).

The invention may be used within a variety of applications wherein a fluid is movable between an inlet and an outlet. One specific, non-limiting example is a slurry pump wherein a seal assembly is required about a rotatable shaft to prevent leakage between a process-side (29) and an atmosphere-side (21) and the seal assembly must resist premature wear of sealing components by abrasive particles.

The description above indicates that a great degree of flexibility is offered in terms of the present invention. Therefore, the scope of the appended claims should not be limited to the descriptions of the preferred versions contained herein.

What is claimed is:

1. A gland seal configured to be accommodated within a stuffing box bore of a stuffing box with at least one bolt circle, the gland seal to seal a slurry on a process side from passing along a rotating shaft to an atmosphere side, the stuffing box comprising:
    a primary gland body having a primary cavity and a flange with at least one bolt hole aligning with the at least one bolt circle;
    a primary shaft sleeve having a cylindrical internal shaft mating surface to accommodate the rotating shaft and an external surface;
    a labyrinth housing extending from the external surface to define a radial labyrinth cavity that accommodates an elastomeric boot;
    wherein the primary shaft sleeve is accommodated within the primary gland body; and
    wherein the primary cavity has a channel to accommodate a retaining ring that presses against a boot keeper to retain the elastomeric boot in position.

2. The gland seal of claim 1, further comprising an alignment bushing on at least one of a process side of the primary gland body and an atmosphere side of the primary gland body.

3. The gland seal of claim 1, further comprising a pressurized grease feedthrough in the primary gland body that feeds grease into the primary cavity.

4. The gland seal of claim 1, further comprising an axial adjustment cavity between a process side of the primary gland body and the primary shaft sleeve.

5. The gland seal of claim 1, further comprising an annular boot-keeper compression ring that compresses the elastomeric boot against the boot keeper.

6. The gland seal of claim 5, wherein the primary cavity comprises a counter-bore and the annular boot-keeper compression ring comprises a ring seal that creates a hermetic seal between the counter-bore and the boot-keeper compression ring.

7. A gland seal configured to be accommodated within a stuffing box bore of a stuffing box with at least one bolt circle, the gland seal to seal a slurry on a process side from passing along a rotating shaft to an atmosphere side, the stuffing box comprising:
    a primary gland body having a primary cavity and a flange with at least one bolt hole aligning with the at least one bolt circle;
    a primary shaft sleeve having a cylindrical internal shaft mating surface to accommodate the rotating shaft and an external surface;
    a labyrinth housing extending from the external surface to define a radial labyrinth cavity that accommodates an elastomeric boot;
    wherein the primary shaft sleeve is accommodated within the primary gland body; and
    wherein the primary gland body comprises a sealing surface that contacts a stuffing box bore shoulder mating surface, and wherein the sealing surface has an O-ring cavity that accommodates a ring seal that creates a hermetic seal between the sealing surface and the stuffing box bore shoulder mating surface when the gland seal is installed.

8. A gland seal configured to be accommodated within a stuffing box bore of a stuffing box with at least one bolt circle, the gland seal to seal a slurry on a process side from passing along a rotating shaft to an atmosphere side, the stuffing box comprising:
    a primary gland body having a primary cavity and a flange with at least one bolt hole aligning with the at least one bolt circle;
    a primary shaft sleeve having a cylindrical internal shaft mating surface to accommodate the rotating shaft and an external surface;
    a labyrinth housing extending from the external surface to define a radial labyrinth cavity that accommodates an elastomeric boot;
    wherein the primary shaft sleeve is accommodated within the primary gland body; and
    a high-pressure lip seal that engages the external surface of the primary shaft sleeve and creates a seal between the atmosphere side and the elastomeric boot.

9. The gland seal of claim 8, wherein at least a portion of the external surface of the primary shaft sleeve is coated with a hard coating.

\* \* \* \* \*